United States Patent [19]

Kennedy

[11] Patent Number: 5,073,680
[45] Date of Patent: Dec. 17, 1991

[54] SUBSTATION INTERCONNECTING ELECTRICAL CABLE CONDUCTOR CONNECTING DEVICE

[75] Inventor: James T. Kennedy, Sierra Madre, Calif.

[73] Assignee: Southern California Edison, Rosemead, Calif.

[21] Appl. No.: 597,196

[22] Filed: Oct. 9, 1990

[51] Int. Cl.$^5$ ............................................. H02G 7/00
[52] U.S. Cl. ............................. 174/40 TD; 174/40 R; 174/45 TD; 174/169
[58] Field of Search .................. 174/40 R, 40 TD, 43, 174/45 TD, 69, 86, 99 E, 169; 114/213, 215, 216, 217; 248/64; 267/69-74; 361/333; 403/2; 464/32, 33

[56] References Cited

U.S. PATENT DOCUMENTS

| | | | |
|---|---|---|---|
| 227,095 | 5/1880 | Clark | 174/42 |
| 733,755 | 7/1903 | Schickluna | 174/45 R |
| 798,252 | 8/1905 | Bartlett | 174/42 |
| 816,900 | 4/1906 | Collet | 174/45 TDX |
| 1,873,325 | 8/1932 | Ratigan | 267/70 |
| 2,121,478 | 6/1938 | Dorman | 174/40 TD |
| 2,665,128 | 1/1954 | Guffey | 267/71 |
| 4,409,429 | 10/1983 | Gaylard | 174/40 TD X |

FOREIGN PATENT DOCUMENTS

| | | | |
|---|---|---|---|
| 379224 | 8/1923 | Fed. Rep. of Germany | 174/40 TD |
| 1-234007 | 9/1989 | Japan | 174/99 E |
| 542280 | 3/1977 | U.S.S.R. | 174/40 TD |
| 640388 | 12/1978 | U.S.S.R. | 174/40 TD |
| 1001268 | 2/1983 | U.S.S.R. | 174/40 TD |

Primary Examiner—Leo P. Picard
Assistant Examiner—Bot Lee Ledynh
Attorney, Agent, or Firm—Charles Berman

[57] ABSTRACT

A device for facilitating integrity of an electrical interconnection of a pair of electrical suspended conductor cables includes a flexible conductive loop and a tension retainer between the cables. Free adjacent spaced apart ends of the cables are connected to the loop, the loop being electrically in series with the cables. A tension retainer is in series structurally with the respective adjacent and spaced ends of the two electrical conductor cables and maintains a first position of suspension. Axial tension on at least one of the cable tending relatively to separate the cables causes movement or breakage of the tension retainer thereby permitting the flexible conductive loop to move and expand and retain electrical integrity between the cable ends in a second suspended position.

20 Claims, 2 Drawing Sheets

SUBSTATION INTERCONNECTING ELECTRICAL CABLE CONDUCTOR CONNECTING DEVICE

BACKGROUND

Interconnecting substation electrical components with heavy-duty cable conductors requires effective physical flexibility to withstand moderate seismic shaking without damage.

This invention relates to facilitating integrity of electrical interconnection of substation electrical components. In particular, the invention is directed to minimizing problems affecting power utilities operating in seismologically active areas. The invention is directed to substantially reducing earthquake damage to substation equipment.

In substations, high voltage (500 KV and 220 KV class) cable conductors are used to interconnect substation switching equipment. There is a need for adequate flexibility through bending of the conductors to minimize interaction or linking of this equipment during seismic shaking. Without the ability of the conductors to be flexible, brittle equipment components, such as insulators, are subject to breakage from induced loads due to structurally non-compatible interaction with adjacent equipment. The cable conductors are axially stiff and provide the link mechanism which allows axial or longitudinal forces along the cable length to develop and load equipment. Accordingly, linked response forces (LRF) due to movement or resistance to movement of one piece of switching equipment is readily transmitted to an adjacent piece of equipment through the interconnecting stiff cable.

The present manner of minimizing the development of LRF is to introduce a degree of sag into the cable(s) interconnected between adjacent electrical equipments. Increased sag yields increased flexibility. Sag, however, is limited by required electrical clearances between conductors, between conductors and equipment support structures and between conductors and the ground. These electrical clearance requirements have resulted in reduced conductor insulation sag to such an extent that adequate flexibility is not provided by the sag. Without adequate conductor flexibility, cable interconnected adjacent equipment will experience LRF due to seismic shaking. This results in costly failed components and interruption of service.

It is an object of the present invention to provide for increases in conductor flexibility and to maintain integrity between interconnected electrical components during seismic shaking conditions while in normal conditions, the conductor cables will not have excessive sag.

SUMMARY

The invention seeks to provide means for meeting the objectives of providing flexibility, electrical continuity and physical continuity.

According to the invention, there is provided a connecting device for maintaining electrical continuity of an electrical cable conductor spanned between adjacent electrical equipment. The connecting device also provides for physical continuity of the conductor whereby movement of one piece of equipment, in an axial sense relative to the cable conductor, is prevented or reduced from developing LRF between itself and an adjacent piece of equipment interconnected by the cable.

Two separate suspended cable ends are directed towards each other so that they have respective free ends which are spaced apart and adjacent to each other. The free ends are joined by the connecting device of this invention. The connecting device is composed of a flexible conductive loop and a tension retainer. The flexible conductive loop (for electrical continuity) is joined in series electrically with the respective free ends of the first conductive cable and the second conductive cable. The tension retainer (for structural continuity) is connected in series structurally with the two respective adjacent and spaced ends of the electrical conductor cables. The tension retainer holds the cable ends in a first suspended position. The second, increased sag, suspended position is maintained through the extension of the flexible loops for devices as detailed in FIGS. 2 and 3 or through the extension of a spring retainer system as shown in FIG. 4.

In a preferred form of the invention, the flexible loop includes one or more subloops or cyclic loops between the respective ends. Also, one or more electrically separate conductors can be between the respective ends. When more than one conductor is used, the conductors are in electrically parallel arrangement.

In one preferred form, the tension retainer is selectively a tension failure bar wherein there is a transverse section of weakness. Alternatively, there are interengaging overlapping elements such as tubes with a breakable shear pin. In yet another form, a biasing mechanism causes engagement of component parts. Axial tension force on either one of the cables causes the cables to move axially relative to the device. This selectively causes breakage at the transverse failure bar, breakage of the shear pin or disengagement of the engaged components.

The tension retainer and flexible loop connect with the respective ends of the cable conductor through terminal means.

The invention is now further described with reference to the accompanying drawings.

DRAWINGS

DESCRIPTION

Figure 1:
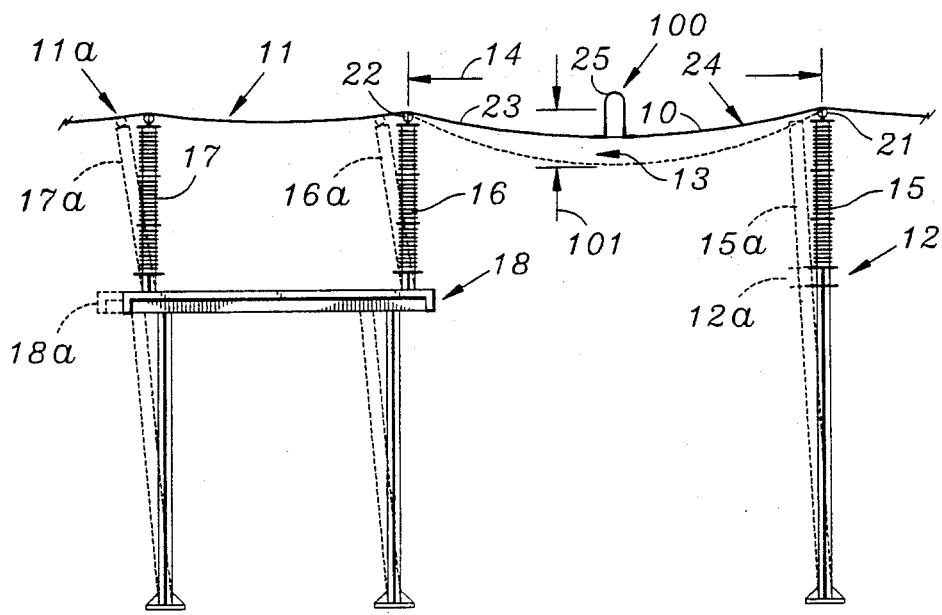
FIG. 1 is a diagrammatic elevational view illustrating electrical equipment pieces with an electrical cable spanning between pieces and illustrating a first embodiment of the connecting device.

A high voltage cable conductor 10 is interconnected between a first piece of electrical equipment 11 and a second adjacent piece of electrical equipment 12. The conductor carries a voltage of, for instance, 500 KV or 220 KV. The cable conductor 10 has a defined first position of sag 13 which is geometrically determined relative to the span 14 between the pieces 11 and 12 to provide acceptable electrical clearances. The equipment 11 is part of a platform configuration utilizing post-like insulator components. Insulator components 15, 16 and 17, respectively, are made up of brittle glass-like materials.

Shown in phantom as position 11a and 12a, respectively, are the potential movements caused by seismic shaking due to earthquake situations. Individual elements 15a, 16, 17 and 189 of the equipment 11 are respectively shown in the move positions 16a, 17a and 18a. The cable 10 is connected through suitable fixation elements 21 and 22 to the top of the equipments 11 and 12.

The conductive cable 10 is relatively stiff such that axial movement (parallel to cable 10) of either one of the equipments 11 or 12 causes the movement to be translated through the cable 10 to cause movement of adjacent equipment 11 or 12 which is interconnected by the cable 10.

The cable 10 is divided into two sections 23 and 24 and a flexible loop 25 is connected in electrical series between the sections 23 and 24. The loop is illustrated in FIG. 1 and is more fully illustrated in FIG. 4.

The cable 23 ends in a terminal 26 and the cable 24 ends in a terminal 27. The terminal 26 is screw connected to a block 28 and the terminal 27 is screw connected to a block 29. The flexible loop 25 is similarly connected to a terminal 30 which is screw connected to block 28 and a terminal 31 which is screw connected to block 29. The cable 32 constituting the flexible loop is a multiple flexible rope lay or a flat braided conductor.

Blocks 28 and 29, respectively, also include engaging plates 33 and 34 which are forced into abutment at line 35 by the helical spring biasing means 36 and 37, respectively mounted with blocks 28 and 29. The plates 33 and 34 are forced to engage structurally through bolt 38 passing through holes 39. In this manner, the blocks 28 and 29 form a tension retainer 100 structurally in series with the ends of the cables 23 and 24.

In the event of seismic shaking or axial force as indicated by arrows 40 or 41, the plates 33 and 34 are caused to separate after the spring members 36 and 37 are compressed to the extremity along bolt 38. In this position, the flexible loop 25 can open or the rope lay 32 extend allowing axial movement of cable sections 23 and 24. The electrical continuity between the cables 23 and 24 is retained with integrity. The suspended cable adopts a second position 101 of sag which is slightly lower than the first sag position 13. Each position is retained due to consort action of both springs 36 and 37, and bolt 38.

By this configuration, the transmission of physical movement of the cable 23 relative to cable 24 or visa versa is accommodated. In this fashion, the LRF is not developed or is reduced as it affects equipment 11 or 12. Accordingly, movement, if due to breakage of one or the other of the equipments 11 or 12 it occurs, and or may not be transmitted to either equipment via cables 23 or 24. This configuration is arranged such that the possibility of breakage of a brittle insulating component is minimized. Indeed, with sufficient flexibility put into the suspended cable 10 by the flexible loop device 25 and tension retainer 100, it is possible that neither of the equipments 11 or 12 would break given the extra degree of flexibility in the system.

Figure 2:
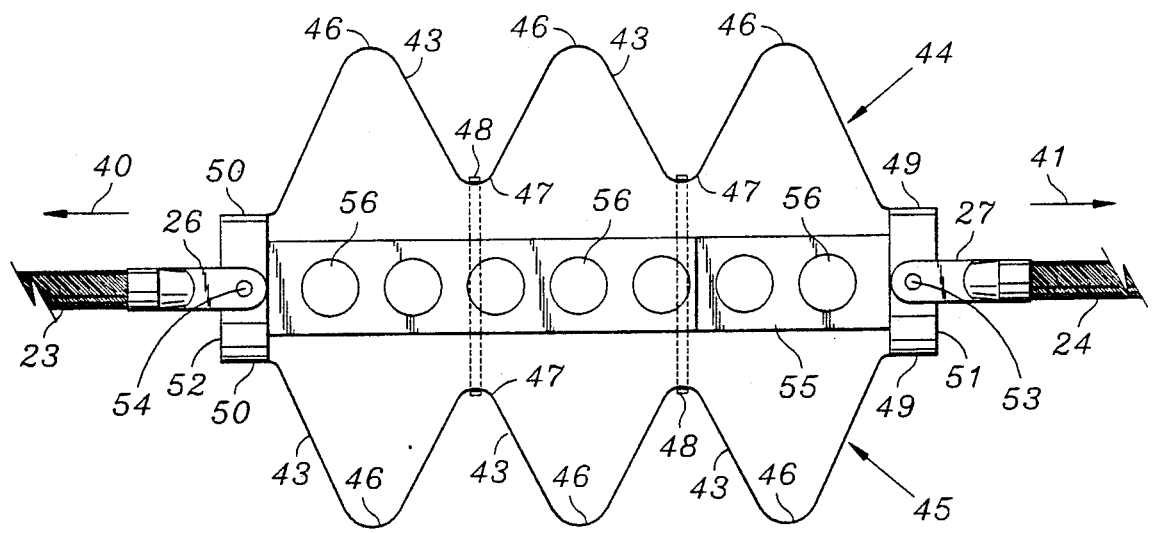
FIG. 2 is a side elevational view illustrating a second embodiment of the isolation device.

In the embodiment illustrated in FIG. 2, the electrical flexible loop 25 is formed by multiple cyclic sections 43. As illustrated, there are multiple such cyclic loops in the flexible loop 25. Also, there are one or multiple conductors 44 and 45 constituting the loop 25. The conductors are of the flat braided type or rope lay type. The cyclic loops 43 form peaks 46 and valleys 47 in their construction. At the valley positions, there are plastic tie strips 48 which surround the conductors 44 and 45 and, in this manner, integrity remains with the loop configurations.

The ends 49 and 50 of the respective pair of conductors 44 and 45 are affixed to terminals 51 and 52, respectively. The terminals have through bolts 53 and 54 which are connected with terminals 26 and 27 which are respectively connected with cables 23 and 24. Also extending between the connectors 51 and 52 is an aluminum tension failure bar 55 which acts as a tension retainer in a structural series relationship with the cables 23 and 24. The tension bar has multiple points of transverse weakness as indicated by cut-out circular sections 56 along the length of the bar. Any axial force on 23 and 24, as indicated respectively by arrows 40 and 41, would be transmitted to the tension bar 55. If that force is sufficiently high, the tension bar fails at one of the transverse points of weakness 56. This permits the flexible loop 25 to extend on one or more of the cyclic sections 43 and thereby extends and provides flexibility to the device to reach the second span position 101. As it extends, the integrity of the electrical connection is retained through the extending flexible loop 25.

Figure 3:
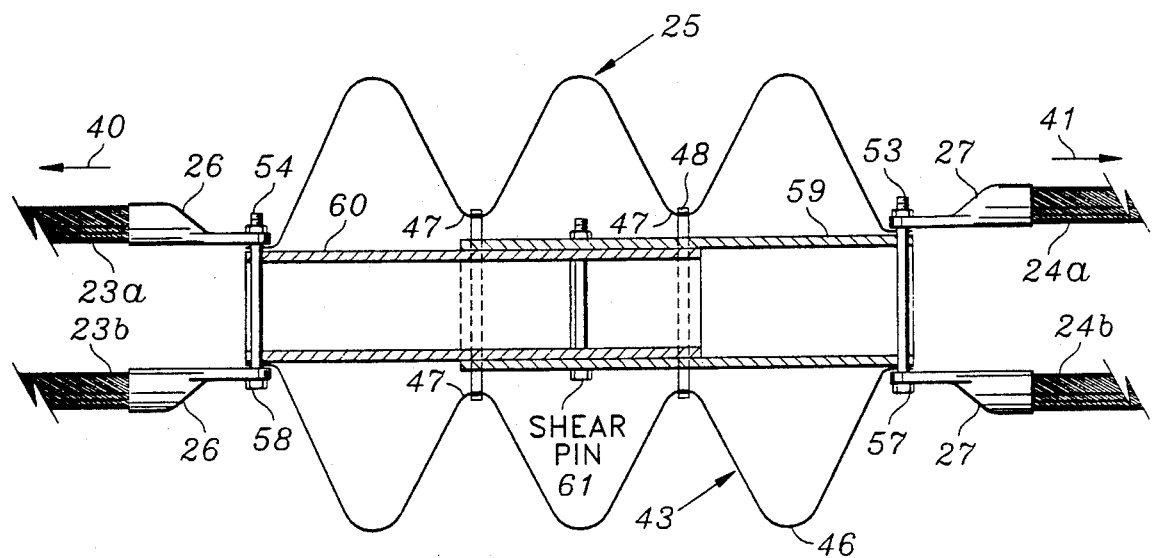
FIG. 3 is a side elevational view illustrating a third embodiment of the connecting device.

In the embodiment illustrated in FIG. 3, a similar flexible loop 25 is connected in electrically in series. Each of the cables 23 and 24 is constituted by a pair, namely 23 and 23b, respectively, and 24a and 24b, respectively. The pairs are connected through terminals 26 and 27, respectively, to points 54 and 53.

The tension retainer is affixed to the points 53 and 54 which are constituted by a cross-bolts 57 and 58. The tension retainer is formed by two slidable aluminum tubes, an outer tube 59 and an inner tube 60. The tubes 59 and 60 are interconnected by a shear pin 61 transversely directed through apertures in the side walls of the tubes 59 and 60. When axial tension force is exhibited according to either one of the arrows 40 or 41, the shear pin 61 can break and permit the aluminum tubes 59 and 60 to move axially relatively apart and thereby permit the device to expand. Electrical integrity is maintained through the flexibility of loop 25. When the tubes 59 and 60 are in the locked position with the shear pin 61 intact, the cable 10 is in the first sag position 13, being held there by the tension retainer.

Many other forms of the invention exist, each differing from the other on matters of detail only. For instance, instead of switching equipment 11 and 12, the components on either side could be electrical metering apparatus or separate bolt insulators. As illustrated, the device is supported between the equipments 11 and 12 and is not mounted about or on the equipment or similar component 11 or 12. In other words, the device is freely suspended in the middle of the length of cable 10, and there is no physical support between the device and the ground in the embodiments illustrated. Also, in other forms, the device can be connected between two electrical components, such as insulators, at least one of which is a rigid connection.

When the tension retainer opens under abnormal conditions, the cable 10 sags to position 101. The sag 101, however, may be undesirable in optimum electrical conditions since it may be too close to other conductors or too close to the ground. The saving, however, is that the expensive components associated with the supports 11 and 12 are saved from breakage. Under normal operative stable conditions, the circuitry can be isolated and reconstructed.

Figure 4:
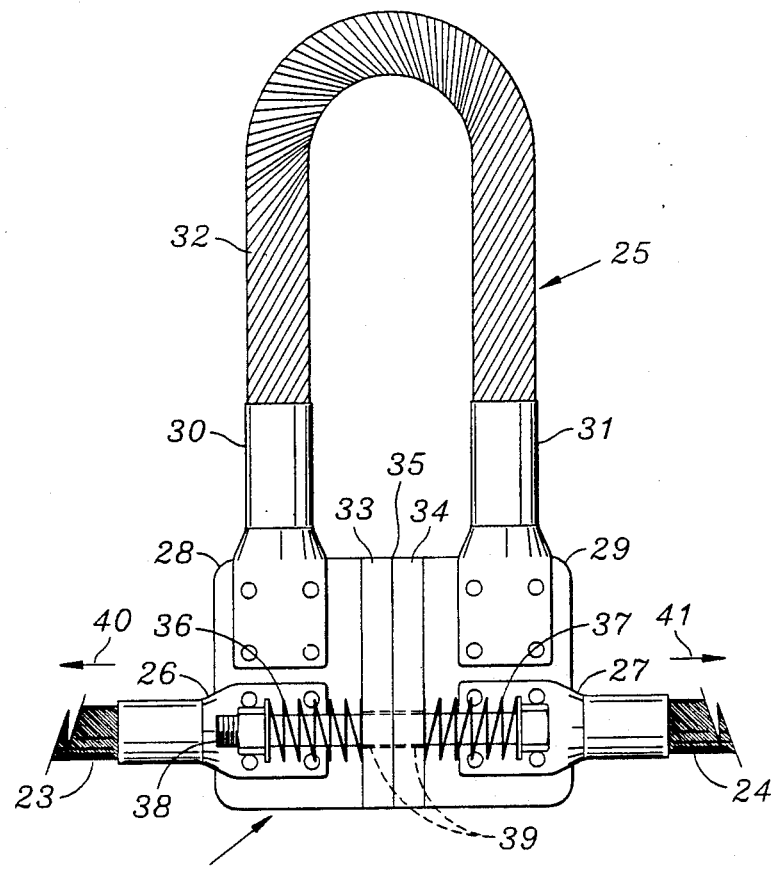
FIG. 4 is a side elevational view illustrating in detail the connecting device shown in FIG. 1.

In the embodiment illustrated in FIGS. 1 and 4, the tension retainer can be returned to physical integrity through release of spring compression force developed in springs 36 and 37 as contained by the bolt 38 within holes 39 and the system reconstituted. In the embodiments illustrated in FIGS. 2 and 3, new failure elements 55 and 61, respectively, would have to be installed.

It will be appreciated that many other variations of the invention are possible. Although the invention has been described particularly with reference to substation electrical equipment, there could be application to other cables and supportive systems. The invention is to be considered as limited solely by the scope of the following claims.

I claim:

1. Interconnected electrical equipment comprising, in combination a first suspended electrically conductive cable having a free end, a second electrically conductive cable having a free end, the free ends being spaced apart and being adjacent to each other, a flexible conductive loop in series electrically with the respective free ends, and a tension retainer in series structurally with the two respective free ends, the tension retainer extending directly between the respective free ends thereby to retain the cables in a first suspended state under normal operative conditions and the flexible loop maintaining the cables in a second suspended state under abnormal operative conditions, and the tension retainer including at least a pair of overlapping elements relatively movable with respect to each other and a shear pin for securing the elements in a first relatively overlapping non-movable position wherein the cables are held in the first suspended state with the elements in a first secured and immovable position such that the tension retainer is functional to retain the cables in the first suspended state and wherein a predetermined axial tension force on the elements shears the pin thereby to permit axial extension relatively of the elements and extension of the flexible loop such that the cables become extendible to the second suspended state and the tension retainer becomes non-functional in retaining the cables suspended.

2. The combination as claimed in claim 1 wherein the flexible conductive loop includes multiple separate conductors in electrically parallel relationship, and wherein the overlapping elements are located between the separate conductors.

3. The combination as claimed in claim 2 wherein the multiple separate conductors have multiple cyclic loops between the free ends.

4. The combination as claimed in claim 3 wherein the multiple separate conductors are selectively physically secured relative to each other.

5. The combination as claimed in claim 2 wherein the multiple separate conductors are selectively physically secured relative to each other.

6. The combination as claimed in claim 1 wherein the flexible loop includes multiple cyclic loops between the free ends.

7. The combination as claimed in claim 1 wherein the free ends are affixed to terminals, the terminals interengaging pivotally with the flexible loop.

8. The combination as claimed in claim 1 wherein the tension retainer includes free ends, the free ends being connected with terminal means affixed respectively to the free ends, the first and second electrically conductive cables being constituted selectively each by one or multiple separate conductors.

9. The combination as claimed in claim 1 wherein the flexible loop is constituted selectively by a flat braided conductor or multiple flexible rope lay or multiples of either.

10. Interconnected electrical equipment comprising, in combination, a first suspended electrically conductive cable having a free end, a second suspended electrically conductive cable having a free end, the free ends being spaced apart and being adjacent to each other, a flexible conductive loop in series electrically with the respective free ends of the first conductive cable and second conductive cable, and a tension retainer in series structurally with the two respective free ends of the electrically conductive cables, the tension retainer extending directly between the respective free ends thereby to retain the cables in a first suspended state under normal operative conditions and the flexible loop containing a length of material to maintain the cables in a second suspended state under abnormal operative conditions, the flexible conductive loop including multiple separate conductors in electrically parallel relationship, and the multiple separate conductors having multiple cyclic loops between the free ends of the respective conductive cables, the free ends of the conductive cables being affixed to terminals, the terminals interengaging with the flexible loop, and the tension retainer including at least a pair of overlapping elements relatively movable with respect to each other and a transverse shear pin for securing the elements in a first relatively overlapping non-movable position wherein the cables are held in the first suspended state with the elements in a first secured and immovable position such that the tension retainer is functional to retain the cables in the first suspended state and wherein a predetermined axial tension force on the elements shears the pin thereby to permit axial extension relatively of the elements and extension of the flexible loop such that the cables become extendible to the second suspended state and the tension retainer becomes non-functional in retaining the cables suspended.

11. Interconnected electrical equipment comprising, in combination, at least two spaced insulator components, a first suspended electrically conductive cable attached to a first insulator component and directed towards a second insulator component and a second suspended electrically conductive cable attached to the second insulator component and directed towards the first insulator component such that each of the first electrically conductive cable and the second electrically conductive cable has a respective free end, the free ends being spaced apart and being adjacent to each other, a flexible conductive loop in series electrically with the respective free ends of the first conductive cable and second conductive cable, and a tension retainer in series structurally with the two respective free ends of the electrically conductive cables, the tension retainer extending directly between the respective free ends thereby to retain the cables in a first suspended state under normal operative conditions and the flexible loop containing a length of material to maintain the cables in a second suspended state under abnormal operative conditions, the free ends of the conductive cables being affixed to terminals, the terminals interengaging with the flexible loop, the tension retainer including free ends, the free ends of the tension retainer connected with the terminals affixed respectively to the free ends of the first and second electrically conductive cables, the first and second electrically conductive cables being constituted selectively each by one or multiple separate conductors and the tension retainer including at least a pair of overlapping elements relatively movable with respect to each other and a transverse shear pin for securing the elements in a first relatively overlapping non-movable position wherein the cables are held in the first suspended state with the elements in a first secured and immovable position such that the tension retainer is functional to retain the cables in the first suspended state and wherein a predetermined axial tension force on the elements shears the pin thereby to permit axial extension relatively of the elements and extension of the flexible loop such that the cables become extendible to the second suspended state and the tension retainer becomes non-functional in retaining the cables suspended.

12. The combination as claimed in claim 11 wherein the flexible conductive loop includes multiple separate conductors in electrically parallel relationship, and wherein the overlapping elements are located between the separate conductors.

13. The combination as claimed in claim 12 wherein the multiple separate conductors have multiple cyclic loops between the free ends of the respective conductive cables.

14. The combination as claimed in claim 13 wherein the multiple separate conductors are selectively physically secured relative to each other.

15. Interconnected electrical equipment comprising, in combination a first electrically conductive element and a second electrically conductive element where the first electrically conductive element and the second electrically conductive element have respective ends, the ends being spaced apart and being adjacent to each other, a flexible conductive loop in series electrically with the respective ends of the first conductive element and second conductive element, and a tension retainer in series structurally with the two respective free ends of the electrically conductive elements, the tension retainer extending directly between the respective free ends thereby to retain the elements in a first state under normal operative conditions and the flexible loop containing a length of material to maintain the elements in a second state under abnormal operative conditions, the tension retainer including at least a pair of overlapping elements relatively movable with respect to each other and a transverse shear pin for securing the overlapping elements in a first relatively overlapping position wherein the conductive elements are held in a first suspended state and wherein a predetermined axial tension force on the overlapping elements shears the pin thereby to permit axial extension relatively of the overlapping elements and extension of the flexible loop such that the conductive elements become extendible to the second state.

16. The combination as claimed in claim 15 wherein the flexible conductive loop includes multiple separate conductors in electrically parallel relationship, and wherein the overlapping elements are located between the separate conductors.

17. The combination as claimed in claim 16 wherein the multiple separate conductors have multiple cyclic loops between the ends of the respective conductive elements.

18. The combination as claimed in claim 17 wherein the multiple separate conductors are selectively physically secured relative to each other.

19. The combination as claimed in claim 16 wherein the multiple separate conductors are selectively physically secured relative to each other.

20. The combination as claimed in claim 15 wherein the flexible loop includes multiple cyclic loops between the ends of the respective conductive elements.

* * * * *